US011138625B2

(12) United States Patent
Gandhi et al.

(10) Patent No.: US 11,138,625 B2
(45) Date of Patent: Oct. 5, 2021

(54) METHODS AND SYSTEMS FOR MANAGING LOCAL AND REMOTE DATA

(71) Applicant: Rovi Guides, Inc., San Jose, CA (US)

(72) Inventors: Gaurav Gandhi, Bangalore (IN); Kuppappa Harijan, Challaghatta (IN); Alok Kumar, Munnekolala (IN)

(73) Assignee: Rovi Guides, Inc., San Jose, CA (US)

(*) Notice: Subject to any disclaimer, the term of this patent is extended or adjusted under 35 U.S.C. 154(b) by 15 days.

(21) Appl. No.: 16/804,248

(22) Filed: Feb. 28, 2020

(65) Prior Publication Data

US 2021/0272150 A1 Sep. 2, 2021

(51) Int. Cl.
*G06Q 30/00* (2012.01)
*G06Q 30/02* (2012.01)
*G06F 16/9535* (2019.01)
*G06K 7/14* (2006.01)

(52) U.S. Cl.
CPC ..... *G06Q 30/0224* (2013.01); *G06F 16/9535* (2019.01); *G06K 7/1417* (2013.01)

(58) Field of Classification Search
None
See application file for complete search history.

(56) References Cited

U.S. PATENT DOCUMENTS

| 10,891,651 | B1* | 1/2021 | Gratz | G06Q 30/0246 |
| 2006/0129463 | A1* | 6/2006 | Zicherman | G06Q 30/0277 705/14.73 |
| 2009/0163227 | A1* | 6/2009 | Collins | G06Q 30/02 455/456.3 |
| 2013/0024371 | A1* | 1/2013 | Hariramani | G06Q 20/384 705/41 |
| 2013/0117080 | A1* | 5/2013 | Madsen | G06Q 30/0251 705/14 |
| 2019/0005542 | A1* | 1/2019 | Goldshtein | G06Q 30/0267 |

* cited by examiner

*Primary Examiner* — Eric R Netzloff
*Assistant Examiner* — Christopher Stroud
(74) *Attorney, Agent, or Firm* — Haley Guiliano LLP

(57) ABSTRACT

Embodiments of the present disclosure includes systems for and methods of managing local and remote data. A method falling within the disclosure includes: receiving, by a device, an offer via an application; storing, in an entry of a local data structure, data identifying the offer and the application via which that data was received; receiving, by the device, a search request; identifying that the search request relates to the offer; in response to identifying that the search request relates to the offer: comparing the data identifying the offer stored in the entry of the local data structure to data identifying an offer available from a source remote from the device; selecting one of the offer stored in the entry of the local data structure or the offer available from the source remote from the device based on the comparing; in response to selecting the offer stored in the entry of the local data structure, causing the application identified by the entry to generate for display the offer identified by the entry; and in response to selecting the offer available from the source remote from the device, causing a separate application to generate the offer available from the source remote from the device.

18 Claims, 9 Drawing Sheets

200

| Offer ID | Description | Price | Expiry Date | Originating Application ID |
|---|---|---|---|---|
| 000259 | Frozen 2 | $10.00 | 2020/03/28 | 000005 |
| 000365 | Frozen 2 | $11.45 | 2020/03/20 | 000015 |
| 000654 | Star Wars | $9.45 | 2020/04/13 | 000005 |
| 000714 | MIB | $12.49 | 2020/05/14 | 000005 |

| Friday February 8, 2020 | 4:24 PM | |
|---|---|---|
| FROZEN 2 <br> 01:36:00 | AMAZON PRIME <br> $9.95 | |

504

| 502 | 4:00 PM | 4:30 PM | 5:00 PM |
|---|---|---|---|
| 2 FOX | The Simpsons | King of the Hill | Joe Millionaire |
| 3 ABC | The Bourne Identity | | |
| 4 NBC | Will and Grace | Friends | ER |
| 5 HBO (VOD) | HBO on Demand | | |
| 6 CNN | News 24 | | |

| 506 | 508 |
|---|---|
| Search For "Frozen 2" | GO |

FIG. 5

METHODS AND SYSTEMS FOR MANAGING LOCAL AND REMOTE DATA

BACKGROUND

Due to the plethora of offers received by consumers through multiple devices, it is difficult for a consumer to locate and identify offers that relate to potential transactions. An "offer" in the context of the present disclosure generally relates to an electronic communication delivered to a device by way of an application and which a consumer is encouraged to accept to purchase goods or service. The consumer may have received an offer to download a movie several weeks previous. This offer could have been received by SMS message, email, notification, for example, and could have been received by way of one or more devices. The consumer may or may not have seen the offer as it was delivered to the device. Even if the consumer had seen the offer there is no straight forward means of locating the offer for subsequent acceptance.

Consumers typically shop online through a search engine (e.g., Google) or specific e-commerce platform (e.g., Amazon or eBay). It is quite easy for the consumer to identify and select the most appropriate offer for them based on one more criteria such as relevance, location or price. However, the offer that the consumer selects may not be the best offer. The best offer may have been received by the consumer by way of one or more devices. The consumer, in many cases, would miss the better offer and/or not even be aware of its existence.

It is against this background that embodiments of the present disclosure have arisen.

SUMMARY

Accordingly, methods and systems are described herein for managing local and remote data. More particularly, the methods and systems described herein are directed to managing local and remote offers received by a device. Local offers may be received via one or more applications and stored in a local data structure of the device. Remote offers may be received via a search engine or e-commerce platform. Upon receiving a search request by way of the device, the search request may be identified as relating to one or more offers stored in the local data structure of the device. Those local offers may be compared against associated remote offers that are retrieved by way of the search request. One offer may be selected from the local offer(s) or remote offer(s). In the case the selected offer is a local offer, the selected offer may be caused to generate for display on the device by way of the application from which the device received the offer from. In the case the selected offer is an offer available from a source remote from the device, the selected offer may be caused to generate for display on the device by way of a separate application, i.e. an Internet browser.

Embodiments of the disclosure bring searching of offers stored in a local data structure on a device and offers available from a source remote from the device (e.g., through the Internet) together such that a single search request through a single search function can return an offer(s) from the local data structure and/or the remote source. Advantageously, a consumer does not have to search through stored notifications to find offers that are relevant to him/her. By entering search terms into a search function (e.g., through a media guidance application), results from streaming services, the Internet, e-commerce platforms, for example, are augmented with search results from offers stored in the local data structure of the device. One advantage of this is that it does not matter if the consumer has never seen the relevant offer or forgotten that it had been sent to his/her device. Another advantage is that the consumer will be presented with the single most appropriate offer relevant to his/her search terms and preferences.

In another embodiment, a consumer may compare offers available in a brick and mortar store to offers received by the device. In such an embodiment, the consumer may input details of the instore offer into the device (e.g., by way of text input, barcode or QR scan or taking a photograph of the relevant item. As described above, the offer received from a source remote from the device (e.g., from in the store) is compared against offers received and stored by the device. One offer from the store and the offers received and stored by the device is selected and generated for display on the device.

Generally, to compare the cost of an item in store with other available offers, a consumer would open up a web browser and manually search for the item to see if it is available for a better price elsewhere. While this is a straight forward task, it is not easy to identify all relevant offers and offers received by the device by way of a notification would not be searched at all. Such offers would thus be missed by searching in this way. This embodiment facilitates searching for alternative offers from a variety of additional sources including offers already received and stored by the device and from the Internet.

In yet another embodiment, offers, in the form of notifications, may be received by multiple devices of a consumer or his/her family and friends. In such an embodiment, the consumer may enter a search request into a device (e.g., a media guidance application or mobile phone). In addition to identifying relevant offers stored locally by the search device, offers received by one or more further devices that allow access by the device may be searched for relevant offers also. Each relevant offer identified is compared with one another and also offers available from other remote sources (e.g., the Internet). One offer may be selected from each of the offers identified and based on the comparing step and then generated for display on the device. If the offer is available on another device, the offer is sent to the device prior to being generated for display on the device.

As consumers tend to have multiple devices and share devices with friends and family, it is quite likely that the offers received by one device, by way of notification, are different to the offers received by another device. Thus, even if a consumer is aware that they have received an offer (e.g., to download "Frozen 2" for $10) they may not know which device the offer was received by. This embodiment facilitates the searching of multiple remote devices that are linked to the device (e.g., by wired or wireless connection or through a user account or family and friend grouping) such that all relevant offers received within a family and friends group may be identified when a consumer makes a search request for downloading Frozen 2, for example.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an illustrative example of a local data structure, in accordance with some embodiments of the disclosure;

FIG. 5 is an illustrative example of a display screen for use in searching and accessing media content, in accordance with some embodiments of the disclosure;

DETAILED DESCRIPTION

Figure 1:
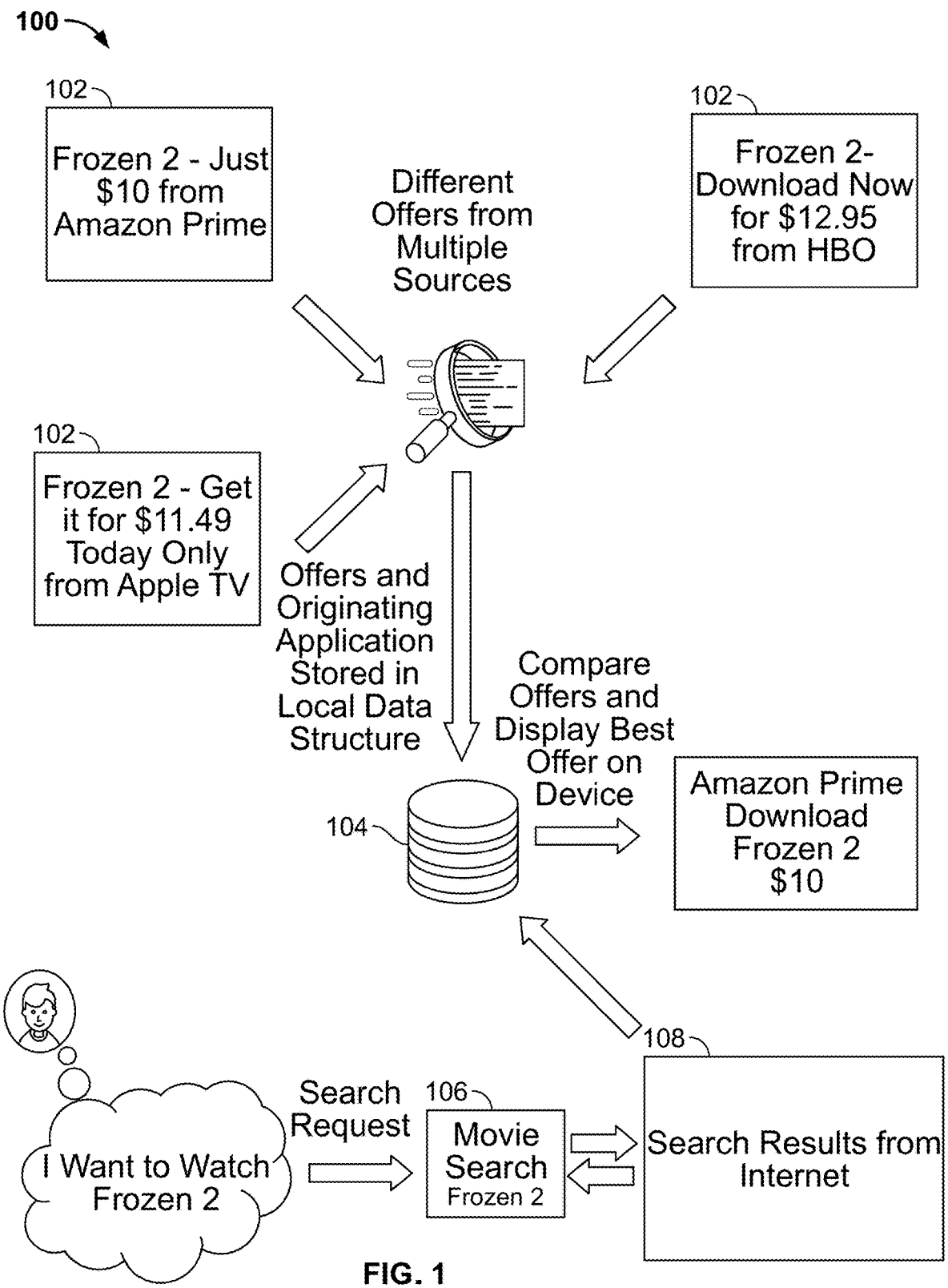
FIG. 1 shows an illustrative example of a method of presenting an offer to a user, in accordance with some embodiments of the disclosure.

Methods and systems are described for managing local and remote data through a device. FIG. 1 shows an illustrative example of a method of presenting an offer to a user, in accordance with some embodiments of the disclosure. A device 100 receives offers 102 from a number of different applications. An application can be any computer program or group of computer programs that is designed for interaction with an end user. Examples include, but are not limited to, e-commerce platforms, media streaming applications (e.g., Amazon Prime or Netflix), social media, email and messaging interfaces. Each offer is stored in a local data structure 104 of the device 100. Upon a consumer entering a search request into a searchable database 106, the searchable database 106 searches both the local data structure 104 and a source 108 remote from the device 100 for relevant offers. The source 108 remote from the device 100 may be the internet, an intranet or one or more separate devices, for example. Upon identification of offers relating to the consumer's search request, such offers are compared and a single offer is selected for display on the device 100. If the selected offer is stored in the local data structure 104, the offer is generated for display on the device 100 by way of the application that originally sent the offer to the device 100. If the selected offer is retrieved from a source 108 remote from the device 100, a separate application causes the offer to be generated for display on the device 100.

In some embodiments, control circuitry may implement the actions required to manage local and remote data. The control circuitry may determine that one or more notifications have been received from one or more applications installed on or accessed by a device 100. In particular, the control circuitry may determine that a notification has been generated for display on a screen associated with the device 100 or has been stored in a notification or messaging log. The control circuitry may, once it has determined that an offer has been received, identify whether the notification relates to an offer. If the notification does not relate to an offer, the control circuitry may take no further action in relation to the notification. If the control circuitry identifies that the notification does relate to an offer, the control circuitry may extract certain information from the offer prior to storage or the control circuitry may designate the entire content of the offer for storage.

Once a notification has been identified as relating to an offer and the relevant data is identified for extraction and/or storage, the control circuitry may store such data in a local data structure associated with the device 100 or another linked device. The local data structure may reside in storage circuitry of the device 100 and may comprise non-volatile memory. An illustrative local data structure is described in more detail below and illustrated in FIG. 2. The stored data may comprise metadata relating to the offer or metadata relating to the content of the offer (e.g., metadata of a movie or TV series).

The control circuitry may generate for display on a screen associated with a device 100 a search interface configured to facilitate search of the local data structure and a remote source (e.g., the Internet or an intranet) by a consumer. Such a search interface is illustrated in FIG. 5. Upon entry of search terms (e.g., by way of text input, image recognition, voice control, barcode or QR scan), the control circuitry may search for content, data or metadata, in both the local data structure of a device and a source remote from the device (e.g., the Internet). The control circuitry may search for content in more than one device and more than one source remote from the device(s). For example, the device which a consumer enters search terms into may be linked (e.g., by a network, Bluetooth, WiFi) to one or more additional devices. In such circumstances, the term device as used herein is intended to encompass a group of networked or linked devices. Furthermore, in addition to searching the Internet, other sources remote from the device may be searched (e.g., an Intranet, social media platform).

The control circuitry may determine whether the search request relates to one or more offers stored in the local data structure 200 and highlight any relevant offers. If no offers are highlighted as being relevant, the search proceeds based solely on a search of a source remote from the device 100. If at least one offer is highlighted as being relevant, the control circuitry may compare such highlighted offers with offers available from the source(s) remote from the device 100. This comparison step may include comparison of the content of the offers, metadata or other data parameter. As a result of comparing locally stored and remote offers, the control circuitry may select one offer for presenting to the consumer.

If the selected offer is one that is stored in the local data structure 200 of the device 100, the control circuitry may cause the application from which the offer originated to display the offer on a screen associated with a device 100. If the selected offer is one that originates from a source remote from the device 100, the control circuitry may cause a separate application (e.g., an Internet browser) to display the offer on a screen associated with the device. In addition to a visual display, the selected offer may be presented audibly, stored for later presentation or transmitted to another device for display. The control circuitry may generate a coupon from the selected offer with key terms for presentation to a consumer (e.g., source, price, expiry date) and a link through which the consumer may interact to accept the offer. The link may be generated within the coupon or sent to the consumer for later interaction (e.g., by email, SMS or messaging application).

FIG. 2 shows an illustrative example of a local data structure 200 in accordance with some embodiments of the disclosure. The local data structure 200 is stored in a non-volatile memory of the device 100. Certain data relating to an offer 102 is extracted from the offer 102 and reproduced in one or more columns of a data table. As shown in FIG. 2, such columns might include: originating application, offer identification, description, price and expiry date. The local data structure is searchable by one or more applications with search functionality (e.g., by a media guidance application).

Figure 3:
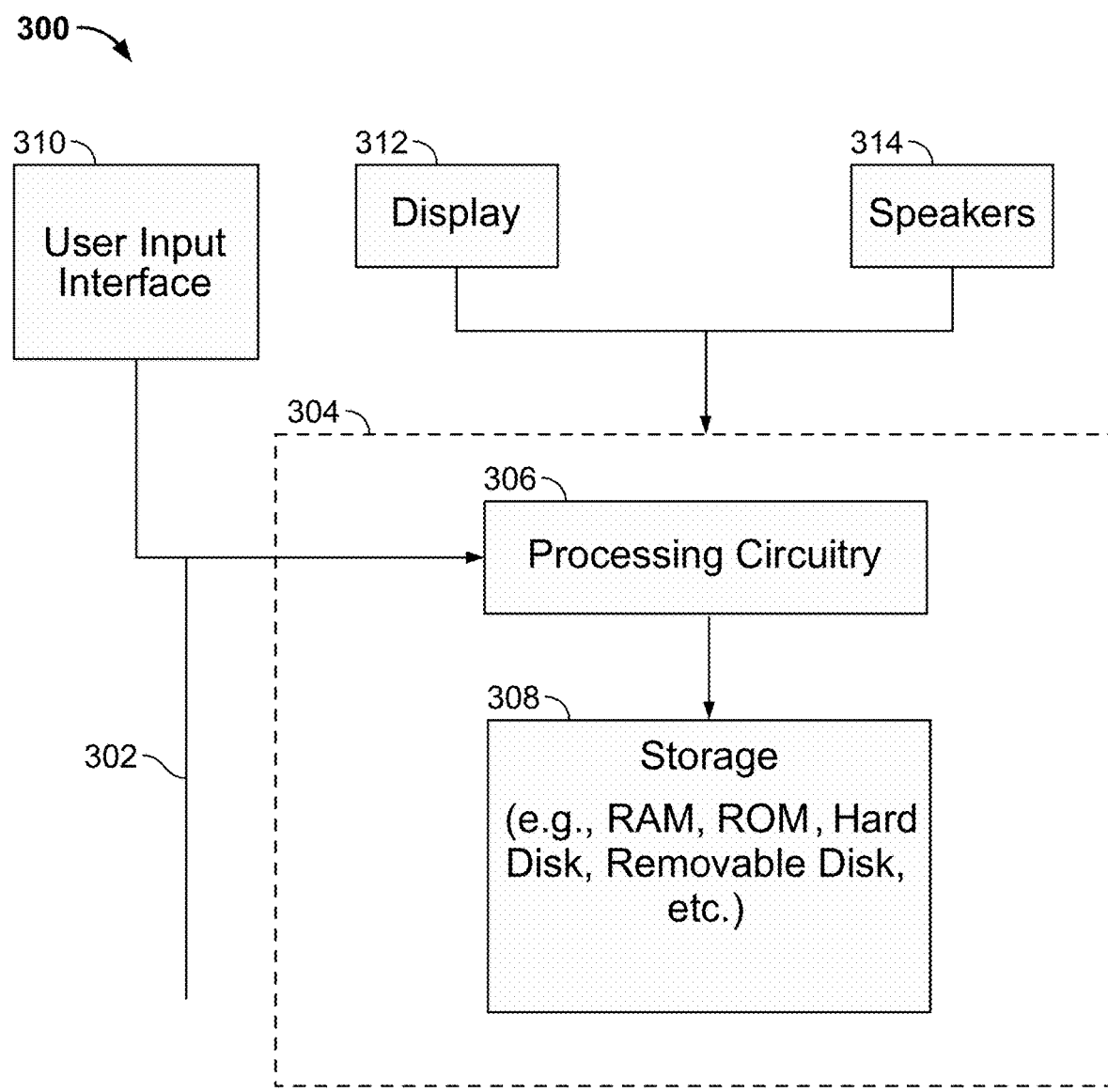
FIG. 3 is a block diagram of an illustrative user equipment device, in accordance with some embodiments of the disclosure.

FIG. 3 is a block diagram of an illustrative user equipment device in accordance with some embodiments of the disclosure. A more specific implementation of a user equipment device is discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 102. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any other suitable number of cores) or supercomputer. In some embodiments, processing circuitry may be distributed across multiple separate processors or processing units (e.g., an Intel Core i5 processor and Intel Core i7 processor). In some embodiments, control circuitry 104 executes instructions for a media guidance application stored in memory (i.e., storage 308). Specifically, control circuitry 304 may be instructed by the media guidance application to perform the functions discussed above and below. For example, the media guidance application may provide instructions to control circuitry 104 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and down-converting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote from the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
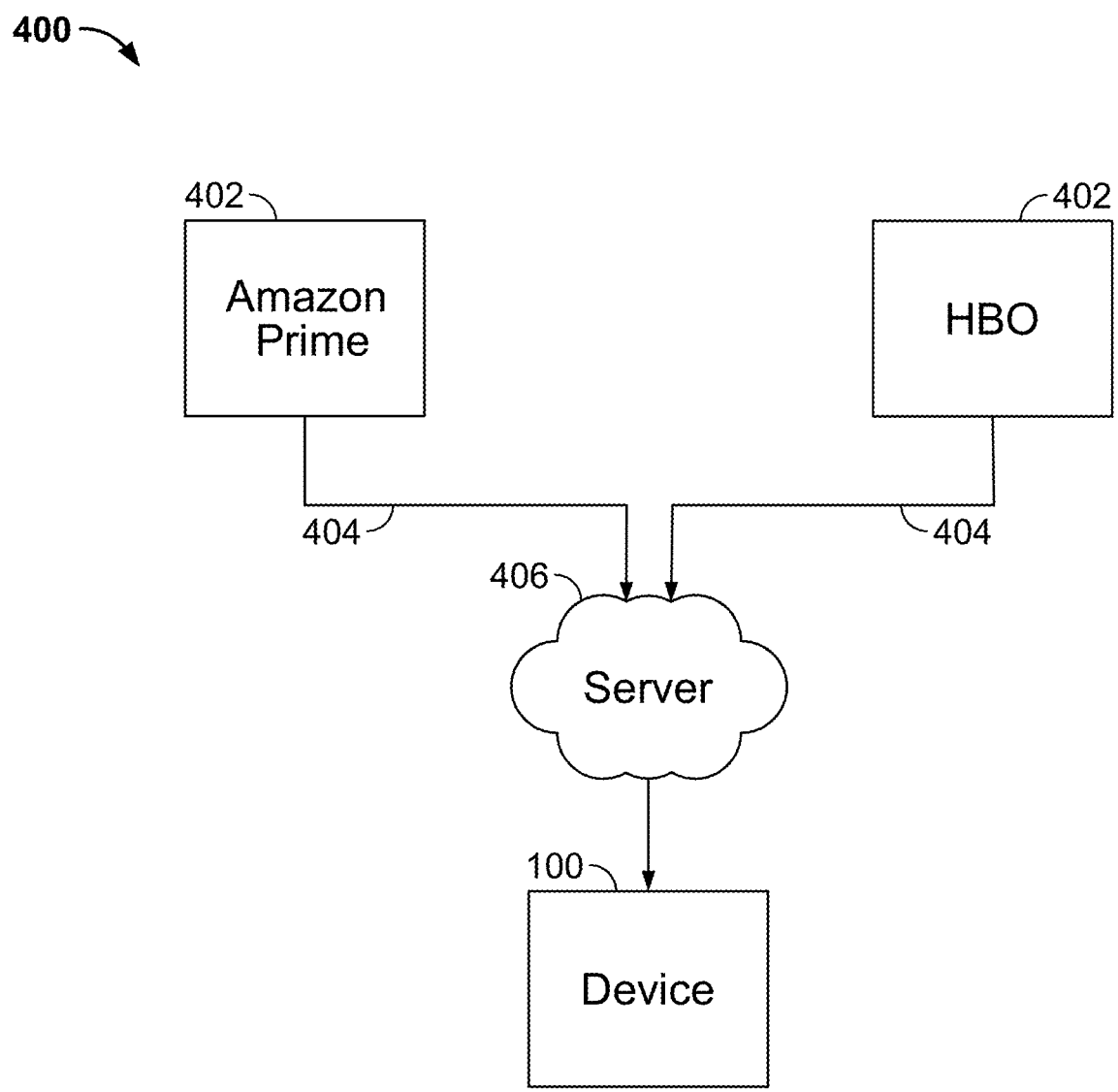
FIG. 4 is a block diagram of an illustrative embodiment, in accordance with some embodiments of the disclosure.

User equipment device 300 of FIG. 3 can be implemented in system 400 of FIG. 4 whereby offers are received from one or more applications 402. Each offer is transmitted by a service associated with each respective application to a server 406. The server 406 relays each offer to the device 100 where each offer is stored and the respective originating application(s) identified. When a search request is received at the device 100, a request is sent to the server 406 to receive search results relating to the request. Such search results are delivered to the device 100 (e.g., to an Internet browser) and compared with offers stored locally. This comparing step is undertaken locally at the device. The device may run a media guidance application and the offers may relate to media content available for download.

FIG. 5 is an illustrative example of a display screen 500 for use in searching and accessing media content, in accordance with some embodiments of the disclosure. Such a display indicates the content that is due to be transmitted 502 on a plurality of different channels during a movable time slot. The content that is currently being displayed is indicated at 504. A search input 506 is provided to input search terms for particular media content that a consumer would like to watch or interact with. The search input may accept text, voice and image inputs, for example. A search button 508 is also provided to instruct the media guidance application depicted to search for content having or being related to the input search terms.

Figure 6:
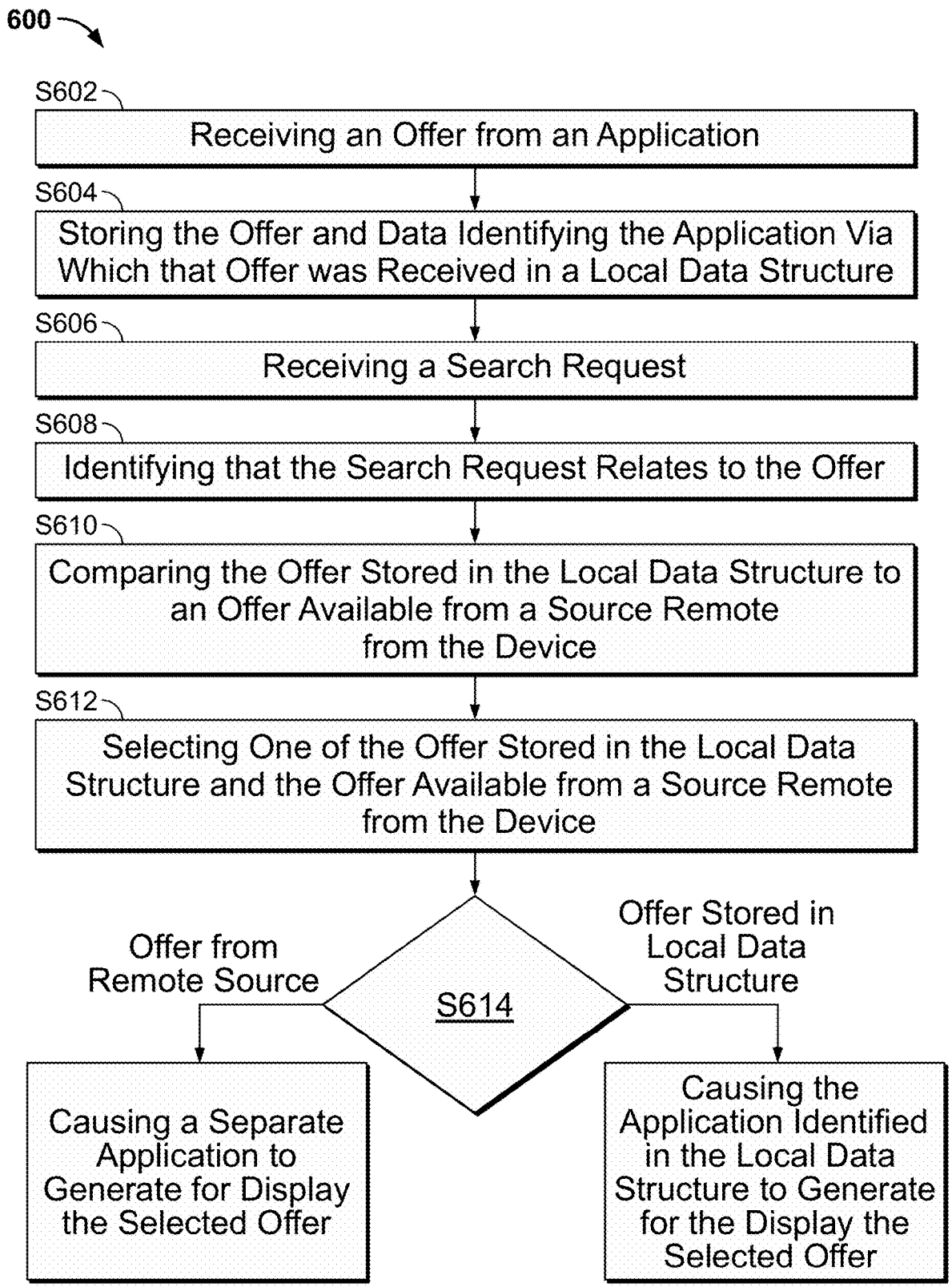
FIG. 6 is a flowchart of illustrative actions for managing local and remote data and presenting an offer to a user, in accordance with some embodiments of the disclosure.

FIG. 6 is a flowchart of illustrative actions for managing local and remote data and presenting an offer to a user, in accordance with some embodiments of the disclosure. For example, a media guidance application implementing process 600 may be executed by control circuitry 304. It should be noted that process 600 or any step thereof could be performed on, or provided by, any of the devices shown in FIG. 3 or 4.

Process 600 begins with step 602, where the media guidance application detects (e.g., via control circuitry 304) that a notification, in the form of an offer, has been received by the device 300. For example, the media guidance application may periodically check (e.g., via control circuitry 304) whether any notifications have been received by the device 300.

Process 600 continues to step 604, where the media guidance application identifies (e.g., via control circuitry 304) an offer associated with a notification. For example, the media guidance application may determine (e.g., via control circuitry 304) that a notification from Amazon Prime is offering Frozen 2 for download for the price of $10. The offer is stored in a local data structure 200 forming part of the storage 308 of the device 300. Data identifying the application from which the offer was received is also stored in the local data structure forming part of the storage 308.

Process 600 continues to step 606, where the media guidance application receives a search request (e.g., via user interface 500) to search for content, e.g., Frozen 2. The user interface 500 may facilitate searching through typing a search term into the media guidance application search field, voice command, selecting a tile for popular content, for example.

Process 600 continues to step 608, where the media guidance application identifies (e.g., via control circuitry 104) that the search request relates to the offer. As a specific example, the offer (e.g., which is stored locally in storage 308) has certain metadata that relates to aspects of the content (e.g., title, duration, actors, producer). When the media guidance application receives the search request at step 606 it compares the search terms to metadata associated with offers stored locally in the storage 308. Those offers that contain metadata related to the search request are identified as relating to the search request.

Process 600 continues to step 610, where the media guidance application compares (e.g., via control circuitry 304) the identified offer(s) to offer(s) available from a source remote from the device 300. As a specific example, the media guidance application finds at least one offer on the Internet, from a streaming platform or a dedicated e-commerce platform. Metadata relating to this offer(s) is compared to metadata relating to the offer(s) stored in the storage 308 of the device 300.

Process 600 continues to step 612, where the media guidance application selects (e.g., via control circuitry 304) one offer from: i) the offer(s) stored in the storage 308 of the device; and ii) the offer(s) available from the source remote from the device. As a specific example, the media guidance application may determine that the price to download Frozen 2 from Amazon Prime through an offer linked to a notification received by the device 300 is $10 and competing offers available from HBO and Apple TV are $11.95 and $12.49 respectively. The media guidance application selects the offer from Amazon Prime based on price.

Process 600 continues to step 614 where one of two actions is taken by the media guidance application depending on the offer selected. If, as per the above example, the media guidance application selects (e.g., via control circuitry 304) the offer from Amazon Prime which is linked to a notification received by the device 300, the application (e.g., Amazon Prime) causes the offer to be generated for display on the device 300. If, on the other hand, the media guidance application selects (e.g., via control circuitry 304 (FIG. 3)) an offer from a source remote from the device (e.g., the offer from Apple TV), the separate application (e.g., Apple TV) causes the offer to be displayed on the device 300.

Figure 7:
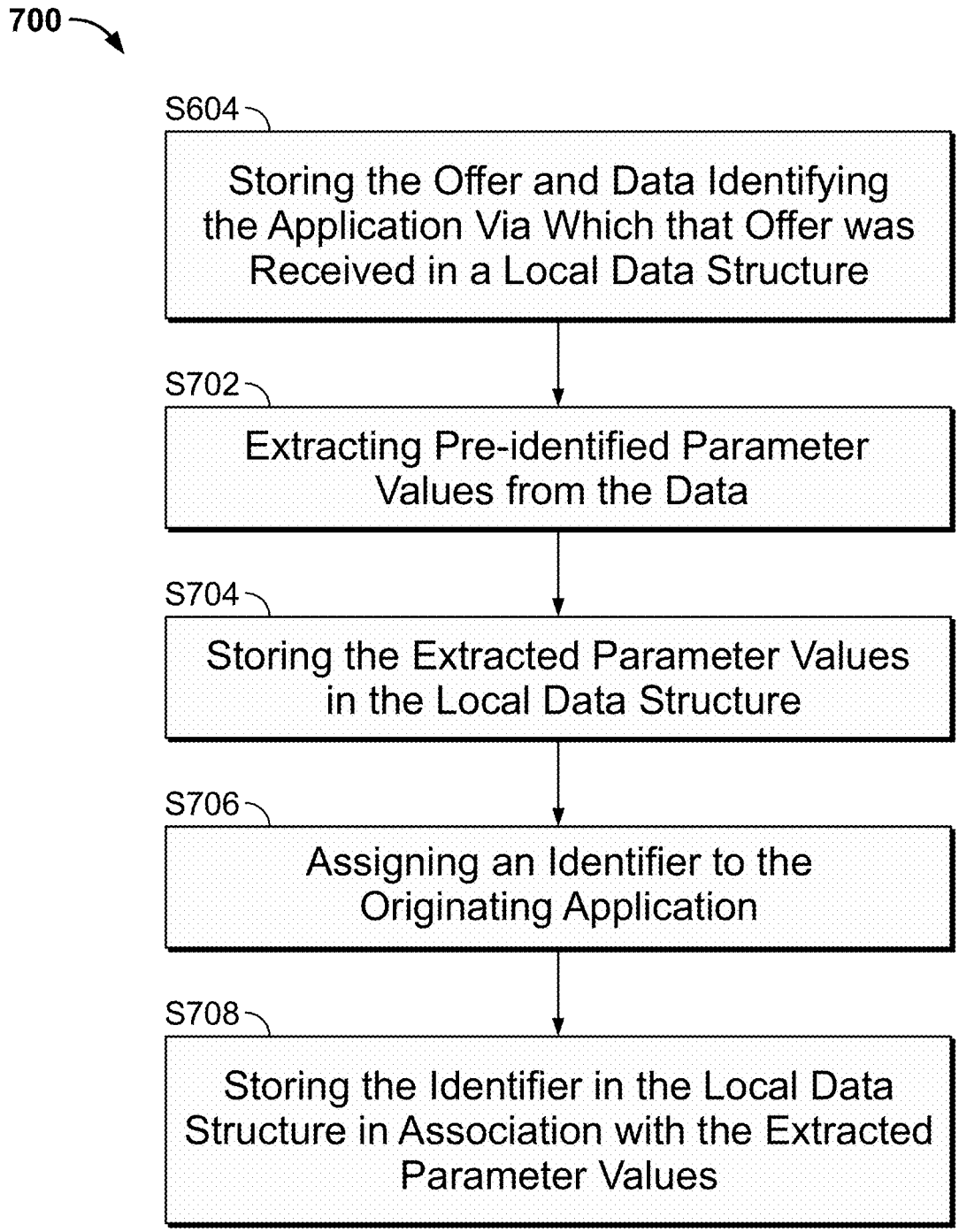
FIG. 7 is a flowchart of illustrative actions for storing in an entry of a local data structure, data identifying an offer and an application via which that data was received, in accordance with some embodiments of the disclosure.

FIG. 7 is a flowchart of illustrative actions for storing in an entry of a local data structure, data identifying an offer and an application via which that data was received, in accordance with some embodiments of the disclosure. Such a storage step is illustrated in FIG. 6 at step 604. Step 604 can be expanded to continue to sub-process 700 and step 702, where the media guidance application extracts certain data from the notification (e.g., identification data, originating application, offer terms). This extracted data could be metadata relating to a particular content item associated with the notification.

Sub-process 700 continues to step 704, where the extracted data is stored in the local data structure of the device. At step 706, an identifier is assigned to the originating application (e.g., if a notification is identified as being received from Amazon Prime, an identifier which may be alphanumeric is assigned. At step 708, the identifier is stored in the local data structure of the device 300 such that the identifier is associated with relevant data extracted from notifications received by the device.

Figure 8:
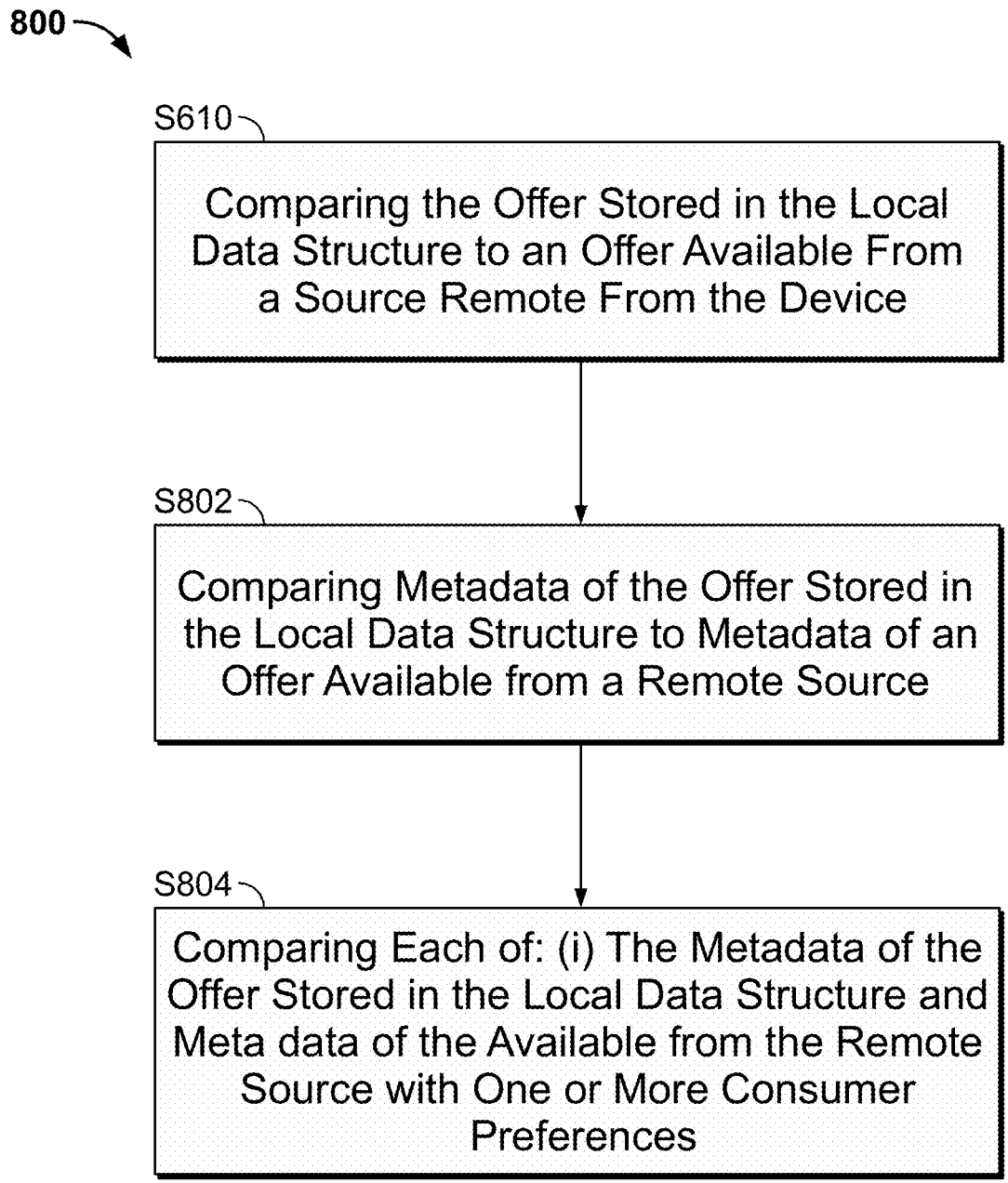
FIG. 8 is a flowchart of illustrative actions for comparing data identifying an offer stored in an entry of a local data structure to data identifying an offer available from a source remote from the local data structure, in accordance with some embodiments of the disclosure.

FIG. 8 is a flowchart of illustrative actions for comparing data identifying an offer stored in an entry of a local data structure to data identifying an offer available from a source remote from the local data structure, in accordance with some embodiments of the disclosure. Such a comparing step is illustrated in FIG. 6 at step 610. Step 610 can be expanded to continue to sub-process 800 and step 802, where the media guidance application compares metadata of data identifying an offer stored in the entry of the local data structure of the device 100 to metadata of the data identifying an offer available from a source remote from the device.

Sub-process 800 continues to step 804, where the media guidance application compares each of: i) metadata of the data identifying an offer stored in the entry of the local data structure of device 300; and ii) metadata of the data identifying an offer available from a source remote from the device, with one or more consumer preferences.

Figure 9:
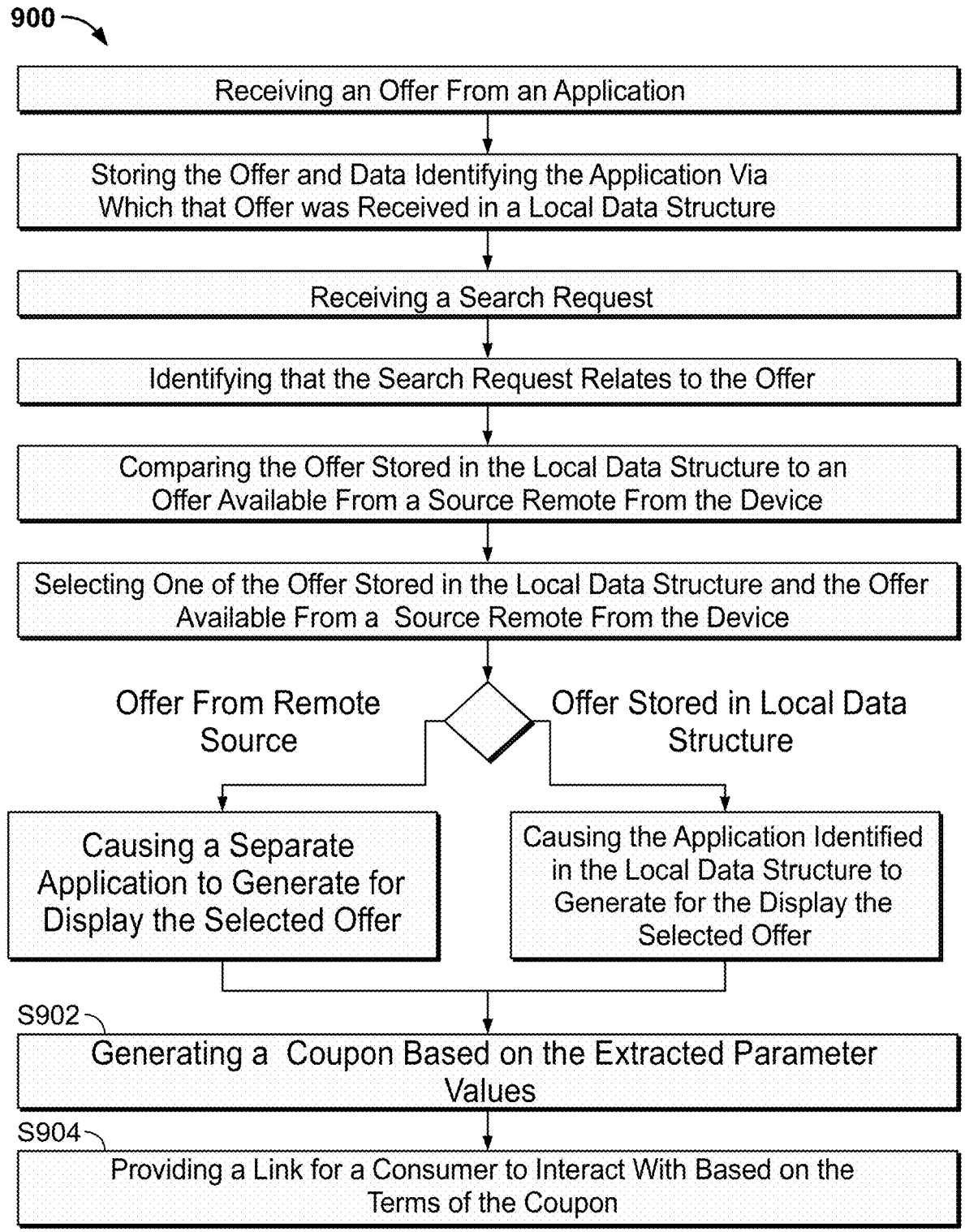
FIG. 9 is a further flowchart of illustrative actions for managing local and remote data, in accordance with some embodiments of the invention.

FIG. 9 is a further flowchart of illustrative actions for managing local and remote data, in accordance with some embodiments of the invention. Such actions are illustrated in FIG. 6 by way of flowchart 600. Flowchart 600 can be expanded to continue to sub-process 900 and step 902, where a coupon is generated based on the extracted data or parameter values. The coupon provides the terms of the offer and is what is presented for display to a consumer. Furthermore, at step 904, a link may be presented to the consumer for the consumer to interact with and complete a transaction based on the terms of the offer as depicted by the coupon.

While some portions of this disclosure may make reference to "convention," any such reference is merely for the purpose of providing context to the invention(s) of the instant disclosure, and does not form any admission as to what constitutes the state of the art.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for managing local and remote data, the method comprising:

receiving, by a device, an offer via an application;

storing, in an entry of a local data structure of the device, data identifying the offer and the application via which that data was received, wherein the storing comprises:
assigning an identifier to the application via which the offer was received;
storing the identifier in the local data structure;
receiving, by the device, a search request via a media guidance application residing on, or in communication with, the device;
identifying that the search request relates to the offer;
in response to identifying that the search request relates to the offer:
comparing the data identifying the offer stored in the entry of the local data structure to data identifying an offer available from a source remote from the device;
selecting one of the offer stored in the entry of the local data structure or the offer available from the source remote from the device based on the comparing;
in response to selecting the offer stored in the entry of the local data structure, causing the application identified by the entry in the local data structure of the device to generate for display on the media guidance application the offer identified by the entry in the local data structure of the device; and
in response to selecting the offer available from the source remote from the device, causing a separate application to generate the offer available from the source remote from the device.

2. The method of claim 1, wherein the comparing further comprises comparing each of the data identifying the offer stored in the entry of the local data structure and the data identifying an offer available from a source remote from the device with one or more user selected criteria, and wherein the selecting further comprises selecting the one offer that is the closest match to the user selected criteria.

3. The method of claim 1, wherein the storing, in an entry of a local data structure, data identifying the offer and the application via which that data was received, comprises:
extracting data from the offer relating to characteristics of the offer; and
storing the extracted data in the local data structure;
wherein the storing the identifier in the local data structure is such that it is associated with the extracted data.

4. The method of claim 1, wherein the comparing the data identifying the offer stored in the entry of the local data structure to data identifying an offer available from a source remote from the device, comprises: comparing of the data identifying the offer stored in the entry of the local data structure to metadata of the data identifying an offer available from a source remote from the device; and
comparing each of: i) the metadata of the data identifying the offer stored in the entry of the local data structure; and ii) the metadata of the data identifying an offer available from a source remote from the device, with one or more consumer preferences.

5. The method of claim 1, wherein the receiving, by the device, a search request, comprises receiving a search request via the device in communication with a media guidance application.

6. The method of claim 5, further comprising:
sending the selected offer to the media guidance application.

7. The method of claim 1, wherein the source remote from the device is an offer made available in a physical store and the comparing is based on an input into the device comprising text input, image recognition, barcode or QR code scan.

8. The method of claim 1, wherein the offer received by the device is a plurality of offers and, wherein the identifying comprises determining whether each of the plurality of offers relates to the search request.

9. The method of claim 8, wherein the source remote from the device is a plurality of sources remote from the device and the comparing comprises determining which of each of the plurality of offers received and stored by the device and the plurality of offers available from offers remote from the device is the best match to one or more pre-determined criteria.

10. The method of claim 2, further comprising:
generating a coupon based on the extracted data; and
providing a link for a consumer to interact with to complete a transaction based on the terms of the coupon.

11. A system for managing local and remote data, the system comprising:
storage circuitry configured to store data identifying an offer received by the system and an application via which that data was received; and
control circuitry configured to:
receive the offer via the application;
assign an identifier to the application via which the offer was received;
store the identifier in a local data structure in the storage circuitry;
receive a search request via a media guidance application residing on, or in communication with, the system;
identify that the search request relates to the offer;
in response to identifying that the search request relates to the offer stored in the storage circuitry:
compare the data identifying the offer stored in the storage circuitry to data identifying an offer available from a remote source;
select one of the offer stored in the storage circuitry or the offer available from the remote source, based on the comparing;
in response to selecting the offer stored in the storage circuitry, cause the application identified in the local data structure of the storage circuitry to generate for display on the media guidance application the selected offer identified in the local data structure of the storage circuitry; and
in response to selecting the offer available from the remote source, cause a separate application to generate for display the selected offer.

12. The system of claim 11, wherein the comparing further comprises comparing each of the data identifying the offer stored in the entry of the local data structure and the data identifying an offer available from a source remote from the device with one or more user selected criteria, and wherein the selecting further comprises selecting the one offer that is the closest match to the user selected criteria.

13. The system of claim 11, wherein the control circuitry is further configured, after receiving a notification, to:
extract data from the offer relating to characteristics of the offer; and
store the extracted data in the local data structure;
wherein the storing the identifier in the local data structure is such that it is associated with the extracted data.

14. The system of claim 11, wherein the control circuitry is further configured, when comparing the data identifying the offer stored in the storage circuitry to data identifying an offer available from a remote source, to:

compare metadata of the data identifying the offer stored in the storage circuitry to metadata of the data identifying an offer available from a remote source; and compare each of: i) the metadata of the data identifying the offer stored in the storage circuitry; and ii) the metadata of the data identifying an offer available from a remote source, with one or more consumer preferences.

15. The system of claim 11, wherein the remote source comprises a group of devices that are linked to the control circuitry and which the device's respective storage circuitry are each accessible to the control circuitry during the comparing.

16. The system of claim 15, wherein the control circuitry is further configured to:

send the selected offer to the media guidance application.

17. The system of claim 11, wherein the control circuitry is configured, when identifying that the search request relates to the offer, to:

determine whether each of a plurality of offers relates to the search request.

18. The system of claim 11, wherein the control circuitry is further configured to:

generate a coupon based on the extracted data; and provide a link for a consumer to interact with to complete a transaction based on the terms of the coupon.

* * * * *